United States Patent [19]

Dolkemeyer et al.

[11] Patent Number: 4,459,273

[45] Date of Patent: * Jul. 10, 1984

[54] CARBON BLACK OBTAINED FROM AQUEOUS SUSPENSIONS

[75] Inventors: Wilfried Dolkemeyer, Bornheim-Uedorf; Kurt Erdt; René Hentges, both of Wesseling; Ewald Meisenburg, Heimerzheim, all of Fed. Rep. of Germany

[73] Assignee: Union Rheinische Braunkohlen Kraftstoff Aktiengesellschaft, Fed. Rep. of Germany

[*] Notice: The portion of the term of this patent subsequent to May 11, 1999 has been disclaimed.

[21] Appl. No.: 350,239

[22] Filed: Feb. 19, 1982

Related U.S. Application Data

[63] Continuation-in-part of Ser. No. 212,363, Dec. 3, 1980, Pat. No. 4,329,329.

[30] Foreign Application Priority Data

Dec. 17, 1979 [DE] Fed. Rep. of Germany ....... 2950705

[51] Int. Cl.$^3$ .............................................. C01B 31/02
[52] U.S. Cl. ................................... 423/461; 423/445; 423/449; 106/307
[58] Field of Search ............... 423/445, 449, 450, 455, 423/456, 461, 460; 106/307

[56] References Cited

U.S. PATENT DOCUMENTS

| | | | |
|---|---|---|---|
| 3,574,547 | 4/1971 | Hinson | 423/449 |
| 4,061,719 | 12/1977 | Schallus | 423/449 |
| 4,097,656 | 6/1978 | Dany et al. | 423/450 |
| 4,098,968 | 7/1978 | Wortmann et al. | 423/450 |
| 4,329,329 | 5/1982 | Dolkemeyer et al. | 423/461 |

FOREIGN PATENT DOCUMENTS

| | | |
|---|---|---|
| 2216155 | 10/1972 | Fed. Rep. of Germany . |
| 2510876 | 9/1976 | Fed. Rep. of Germany . |
| 2546072 | 4/1977 | Fed. Rep. of Germany . |

*Primary Examiner*—Gregory A. Heller
*Attorney, Agent, or Firm*—Connolly and Hutz

[57] ABSTRACT

This invention relates to carbon black obtained from an aqueous suspension. A practically water-free carbon black is obtained from aqueous suspensions by mixing the suspension with liquid low-boiling hydrocarbons, then expanding the mixture in a vessel to evaporate the hydrocarbons, then drawing off separately the hydrocarbon vapors carrying the carbon black and the remaining liquid aqueous phase from the vessel, and separating the carbon black from the hydrocarbon vapors.

2 Claims, 1 Drawing Figure

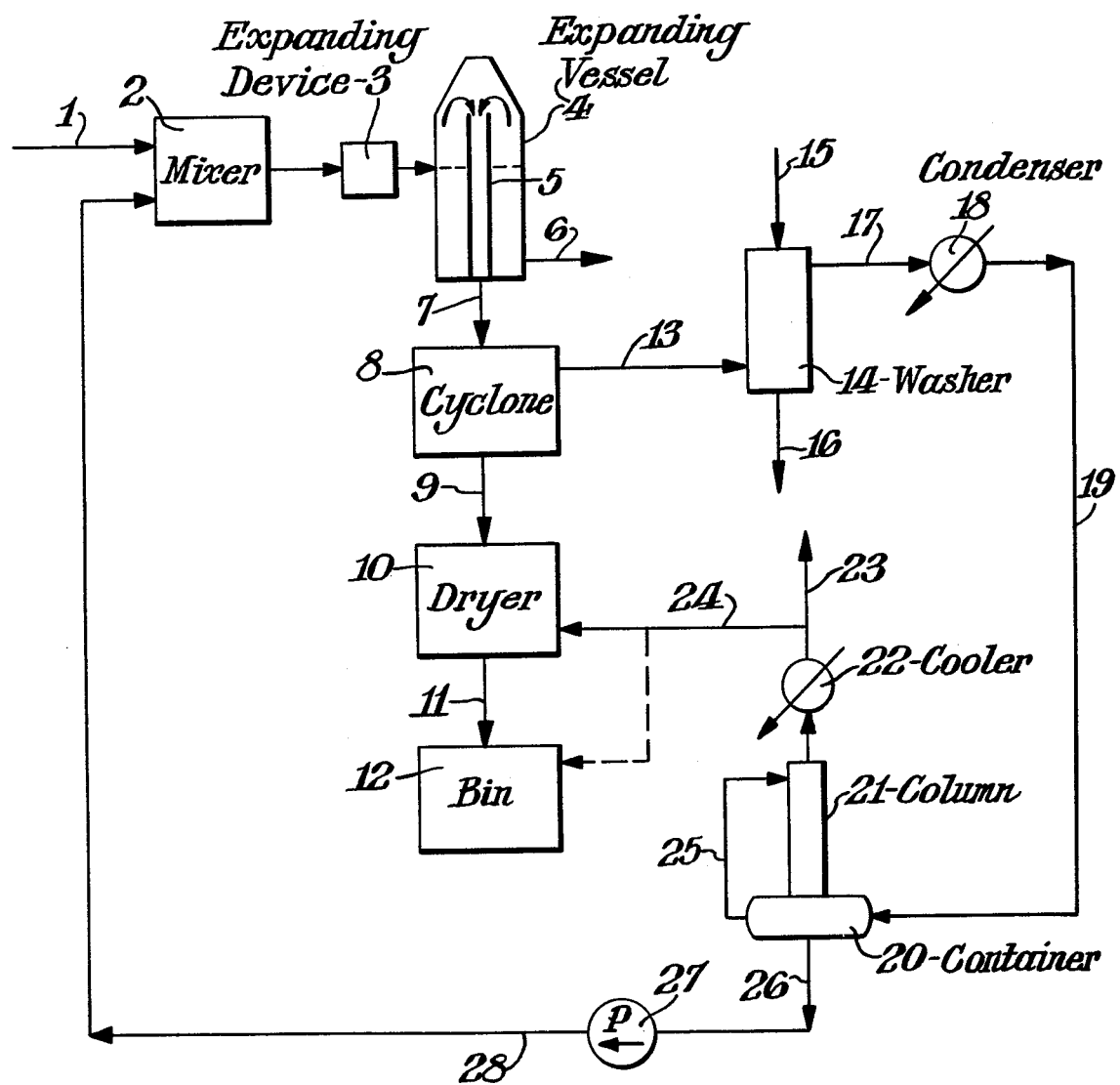

CARBON BLACK OBTAINED FROM AQUEOUS SUSPENSIONS

CROSS REFERENCE TO RELATED APPLICATIONS

The present invention is a continuation-in-part application of application Ser. No. 212,363, filed Dec. 3, 1980, now U.S. Pat. No. 4,329,329, granted May 11, 1982.

BACKGROUND OF THE INVENTION

The present invention relates to a carbon black obtained from an aqueous suspension by mixing the suspension with low-boiling hydrocarbons, then expanding the mixture into a vessel, whereby the mixture separates into a gas phase of the hydrocarbon vapors which form during expansion and carry the carbon black, and into an aqueous liquid phase, and recovering the carbon black from the gas phase.

It is known to hydrophobisize carbon black suspended in water, as produced, for example, in oil-pressure gasification processes, by admixing hydrocarbons, which causes the carbon black to separate from the water. The general purpose of this process is to resupply the separated carbon black to the gasification reactor and to reuse the water freed from carbon black in the process in which the carbon-black-water-suspension is produced. In these cases, it is appropriate to carry out hydrophobisization directly with heavy hydrocarbon oils, e.g. using heavy fuel oils or crude oil vacuum residues. Since the separation process is relatively slow when mixing with heavy oils, even if the process is carried out at elevated temperatures, it has proved successful to carry out hydrophobisization using low boiling hydrocarbons and in a second stage, to mix the carbon black-hydrocarbon-suspension with a heavy oil. After the light hydrocarbons have been separated by distillation, the suspension may then be returned to the gasification installation. If, however, the carbon black is to obtain as such, then, according to the prior art, the suspension of carbon black in liquid hydrocarbons is separated from the carbon black-free water and the hydrocarbon is separated mechanically or by evaporation.

The carbon black obtained in this manner still contains large quantities of water, e.g. as much as 15% (DT OS No. 2,216,155), and even more according to the method of recovering, e.g. from 40 to 70% (DT OS No. 2,510,876). If carbon black having a lower water content is required, then an expensive drying process must be carried out subsequently which generally takes place at temperatures of from 35° to 600° C.

In a process recently described carbon black may be obtained from aqueous carbon black suspensions having a water content of only approximately 2% by weight. This is achieved by treating the aqueous carbon black suspension with low-boiling hydrocarbons at elevated pressure and then expanding the mixture, during which expansion, a separation into evaporated hydrocarbons, water which is extensively freed from carbon black and carbon black takes place (DT OS No. 2,546,072).

SUMMARY OF THE INVENTION

According to the present invention a dry, non-adhesive carbon black having an even lower water content compared with the process described above is obtained from an aqueous suspension, when the suspension containing the carbon black is mixed with liquid low-boiling hydrocarbons, then the mixture is expanded at a temperature of from 20° to 180° C. and at a pressure of from 2 to 30 bars in a vessel to a pressure lower than that of the mixture, then the gaseous phase of the evaporated hydrocarbons, formed during expansion and carrying the carbon black and the remaining liquid aqueous phase, being substantially free of carbon black are drawn off separately from the expansion vessel, and the carbon black is separated from the hydrocarbon vapors.

A loop with a mixing pump is advantageously used for mixing the carbon black-water-suspension and the hydrocarbons, but other mixing members, e.g. an impeller-type mixer, may also be used. The low-boiling hydrocarbons which are to be admixed have appropriately from 3 to 10, and advantageously from 4 to 8 carbon atoms. The following are mentioned as examples: butane, pentane, hexane, benzene, and also benzene fractions of corresponding boiling ranges. The mixing operation takes place, according to the selected hydrocarbons, at from 20° to 180° C. and at a pressure of from 2 to 30 bars. If pentane or hexane is used, mixing is carried out, for example, at from 4 to 8 bars and from 60° to 100° C. The mixture of carbon black, water and hydrocarbon is expanded in a vessel which is at a lower pressure than that of the mixing apparatus. Expansion must be effected such that, for example, by using a pump, the hydrocarbon-water-carbon black system is thereby prevented from separating into its components. Such a separating should not occur until downstream of the expansion apparatus. Expansion is generally carried out to normal pressure, but the expansion vessel may naturally also be operated at a higher or lower pressure, as long as there is an adequate pressure drop between it and the mixing apparatus. The expansion vessel is maintained at a temperature which suffices to allow the hydrocarbon used, but not the water to evaporate. This temperature is generally from 80° to 120° C. The carbon black is removed with the hydrocarbon vapors from the expansion vessel. In a preferred embodiment, a down pipe is positioned in the expansion vessel, which pipe projects high enough above the aqueous phase so that the evaporated hydrocarbons are drawn off together with the carbon black through the down pipe without portions of the aqueous phase passing into the down pipe. It is naturally also possible to remove hydrocarbon vapors and carbon black in another way from the expansion vessel. The aqueous phase, produced in the vessel and being practically free of carbon black is advantageously removed from the lower region of the vessel. It may, for example, be returned into the apparatus for the production of the carbon black suspension or may be introduced into an oil gasification installation as quench water.

The carbon black is separated in known manner from the carbon black-hydrocarbon vapor mixture. Thus, the down pipe may open into a cyclone or centrifugal separator where the carbon black separation takes place. It may be appropriate to subsequently purify the hydrocarbon vapors leaving the cyclone, for example, by a second cyclone and/or a wash. This may be effected, for example, using hot high-boiling hydrocarbon oils which may then be used as a charging material for gasification. Instead of cyclones, other conventional separating devices may be used, for example filters, and also combinations of a cyclone and a filter. The carbon black is separated at elevated temperatures, for example, from 80° to 120°. The hydrocarbon vapors free of carbon black may, for example, be returned after condensation into the mixing apparatus.

The carbon black leaving the expansion vessel with the hydrocarbon vapors generally has a water content of approximately from 0.5 to 1.5% by weight. This content may be reduced by introducing the carbon black into a drying installation after being separated from the hydrocarbon vapors. In this case, in a known manner, for example by heating or by treating with hot inert gases, the water content may be reduced even further. A particular advantage of the process according to the invention is that the drying may be effected at relatively low temperatures, for example at from 200° to 300° C. The carbon black which is thus obtained is water-free, non-adhesive and outstandingly storable.

The carbon black is dry, non-adhesive, and has a nitrogen surface area (ASTM D 3037-78) in the range of 750-1050 m²/g, and a DBP absorption (ASTM D 2414-79) in the range of 380-420 ml/100 g. The particle diameter as determined by electron microscope is about 30 NM.

via line 24. The dried, water-free carbon black is passed into a bin 12 via line 11.

The hydrocarbon vapors, freed from carbon black in the cyclone 8, pass via line 13 into a washer 14 maintained at an elevated temperature where they are washed with heavy oil supplied via line 15, in order to remove from them the last traces of carbon black. The heavy oil used is removed from the process via line 16. The hydrocarbon vapors are introduced into a condenser 18 via line 17 and, after condensation, pass via line 19 into a container 20 with a column 21 in which there is reflux of the condensed hydrocarbon fraction throughout line 25. This is separated from the nitrogen which is introduced. The nitrogen passes via a cooler 22 and line 24 as an inert gas after being heated (not shown) into the dryer, optionally also into the bin 12. If the inert gas is not required here, it is removed from the process via line 23. The hydrocarbon fraction leaves the container 20 via line 26, is brought to the necessary pressure in a pump 27 and passes into the mixing apparatus 2 via line 28.

| CARBON BLACK | NITROGEN SURFACE AREA (m²/g) | DBP ABSORPTION (ml/100 g) | PARTICLE DIAMETER (NM) |
|---|---|---|---|
| Present Invention | 750-1050 | 380-420 | 30 |
| Super Abrasion Furnace | 125-155 | 113 | 18 |
| High Abrasion Furnace | 70-90 | 102 | 30 |
| Medium Processing Channel | 105-125 | 96 | 24 |
| Medium Thermal* | 6-9 | 39 | 300 |
| General Purpose Furnace | 26-42 | 91 | 55 |
| High Color Channel | 1000 | 475 | 10 |
| Acetylene Black | 65 | 320 | 40 |

*"Medium Thermal" means slow thermal decomposition of hydrocarbons in hot chambers.

BRIEF DESCRIPTION OF THE DRAWING

Novel features and advantages of the present invention in addition to those mentioned above will become apparent to one skilled in the art from a reading of the following detailed description in conjunction with the accompanying drawing wherein similar reference characters refer to similar parts and in which:

The process for producing the carbon black of the invention is represented by way of example in a simplified manner with reference to the single FIGURE of the drawing which is a schematic flow diagram of one embodiment of this invention.

DETAILED DESCRIPTION OF THE INVENTION

Into a mixing apparatus 2 which is maintained at an elevated temperature, a carbon black-water suspension at elevated pressure is introduced via line 1 and a low-boiling hydrocarbon fraction at the same pressure is introduced via line 28. The mixture is passed into a heated expansion vessel 4 which is at normal pressure via an expansion device 3. In the expansion vessel 4, separation occurs into an aqueous liquid phase, which is removed from the process via line 6 and into a gaseous phase from the hydrocarbon vapors which also carry the carbon black and flow into a cyclone 8 via a down pipe 5, in expansion vessel 4 extending through the collected liquid aqueous phase, and through a line 7. The cyclone or centrifugal separator 8 is maintained at approximately the same temperature as the vessel 4. The carbon black separated in the cyclone 8 passes via line 9 into a dryer 10, onto which nitrogen is introduced The above table shows that the carbon black of the present invention is a new type which combines very high surface area and DBP-absorption with an unusually high particle diameter. Compare, for example, the carbon black of the present invention with the high color channel carbon black. This means that by adding a certain amount of weight of carbon black of this invention, for example, to a plastic material a composition is obtained which exhibits unusually high electric conductivity because relatively large areas of the composition consist of non-interrupted carbon black-zones. As a result, the present carbon black is highly suitable for applications like video records with electric scanner. Furthermore carbon black-plastic compositions of this type carry no electrostatic charge, which is for example very important in the case of gasoline tanks.

The grit-content of the present carbon black is practically zero. This is a consequence of the separation of the carbon black from the water suspension with the hydrocarbon vapor. Grit means particles with diameters larger than $45 \times 10^{-6}$ m which are mostly non-carbon contaminations like ash and metal oxides. In many applications the absence of grit is very important leading to new applications, for example, video records.

The present carbon black has the further advantage that metal-traces which are smaller than $45 \times 10^{-6}$ m are reduced, the same way as grit particles do, to a low content. This way, for example, the vanadium concentration lowers in the present carbon black to about half the level in comparison to other processes where the ash is not separated.

Example 50 m³/h of an aqueous carbon black suspension, containing 0.8% by weight of carbon black, were mixed with 3 t/h of a low-boiling hydrocarbon fraction at 80° C. and 6 bars and were then expanded in a vessel which was maintained at approximately 80° C. and at normal pressure.

The carbon black leaving the expansion vessel with the hydrocarbon vapors contained 0.7% by weight of water. The water removed from the vessel was practically free of carbon black. The carbon black was separated from the hydrocarbon vapors in a cyclone at approximately 110° C. The carbon black was subsequently dried at approximately 275° C., and was then practically water-free.

We claim:

1. Carbon black obtained from an aqueous suspension by the process of mixing the aqueous suspension containing carbon black with liquid low-boiling hydrocarbons having from 3 to 10 C-atoms, then expanding the mixture in a single expansion step into a vessel which is at a lower pressure than that of the mixture without separating the components of the mixture, the single expansion step being carried out at a temperature of from 20° to 180° C. and at a pressure of from 2 to 30 bars in such a manner that the hydrocarbons are evaporated into a gaseous phase carrying the carbon black but only after expansion, then drawing off separately the gaseous phase of the evaporated hydrocarbons formed after expansion and carrying the carbon black, and the remaining liquid aqueous phase which is substantially free of carbon black from the expansion vessel, and separating the carbon black from the hydrocarbon vapor, the carbon black having a nitrogen surface area in the range of 750–1050 m²/g, and a DBP absorption in the range of 380–420 ml/100 g and wherein the particle diameter is approximately 30 nm.

2. Carbon black as in claim 1 having a low ash content.

* * * * *